Patented Jan. 25, 1927.

1,615,551

UNITED STATES PATENT OFFICE.

JOSEPH B. OESCH, OF MILWAUKEE, WISCONSIN, ASSIGNOR TO THE NEWPORT COMPANY, OF CARROLLVILLE, WISCONSIN, A CORPORATION OF DELAWARE.

TETRAKISAZO DYES, AND THE PROCESS OF MANUFACTURE.

No Drawing. Application filed February 6, 1926. Serial No. 86,656.

This invention relates to tetrakisazo dyes capable of dyeing unmordanted cotton orange to brown shades of great fastness to light. The new dyes are derived from aminoazo bodies of the benzene series, two molecular proportions of m-toluidine as middle components, and one molecular proportion of an end component consisting of phenyl methyl pyrazolone and its substitution products.

These new dyes correspond to the general formula:

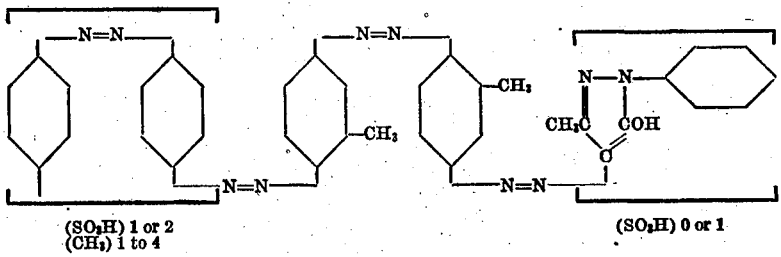

The process of manufacture consists in combining an aminoazo dye of the benzene series with m-toluidine, diazotizing the intermediate disazo dye thus obtained, combining the same with m-toluidine, diazotizing the resulting trisazo dye, and combining the latter with phenyl methyl pyrazolone or a substitution product thereof, such as its sulfonic acids.

Without limiting my invention to any particular procedure, the following example, in which parts by weight are expressed, is given to illustrate the application of my invention in the preferred form.

Dissolve 48 parts of aminoazotoluol disulfonic acid sodium salt in 300 parts of water and diazotize at 0°—5° C. by adding 6.9 parts of sodium nitrite. Then add this solution to 40 parts of hydrochloric acid (20° Bé.), stir and correct excess nitrite. To the diazo compound add a solution of 11.2 parts of m-toluidine dissolved in 150 parts of water and 14 parts of hydrochloric acid (20° Bé.). Stir and add slowly a solution of 31 parts of sodium acetate, stirring until coupling is complete. Add 20 parts of sodium carbonate (in solution) and 7.3 parts of sodium nitrite. Run the mixture into a solution of 81 parts of hydrochloric acid (20° Bé.) in 150 parts of water. Stir, correct excess nitrite, and add a solution of 11.2 parts of m-toluidine in 13.9 parts of hydrochloric acid (20° Bé.) and 150 parts of water. Stir and add slowly 16.5 parts of sodium acetate (in solution). Continue stirring until coupling is completed. Now add 38 parts of sodium carbonate and stir until complete solution is obtained. Then add 191 parts of hydrochloric acid (20° Bé.) and filter. Dilute the filter cake with about 1000 parts of water and add 4 parts of sodium hydroxide. Stir until complete solution is obtained; then add 7 parts of sodium nitrite and run the mixture into a solution of 35 parts of hydrochloric acid (20° Bé.) in 400 parts of water. Stir, correct excess nitrite, and add the diazo component to a solution of 26.2 parts of phenyl methyl pyrazolone sulfonic acid sodium salt which has been previously dissolved in 31.8 parts of sodium carbonate and 200 parts of water. Stir and salt out, filter and dry the filter cake.

The dye thus obtained corresponds to the following formula:

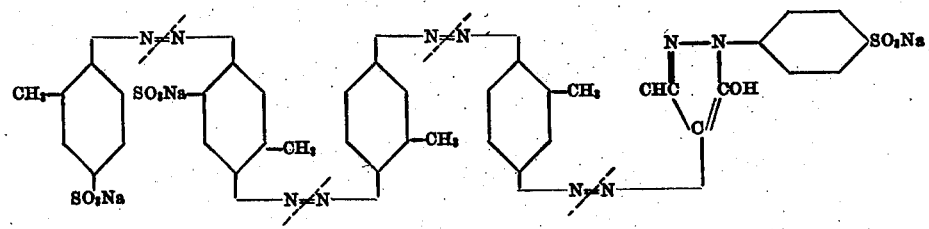

In the shape of their sodium salts, the dyes of this class are dark powders, soluble in water to give brown solutions which change into reddish brown by the addition of caustic soda. With hydrochloric acid the dyes separate as greenish brown precipitates. The dye powders are insoluble in ether and partly soluble in alcohol and benzene. They dye cotton a yellowish brown.

Strong reducing agents split up the tetrakisazo structure, as indicated, to give in the case of the specific dye of the above example, the following reduction products:

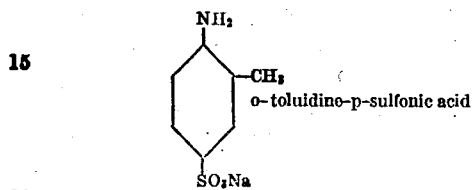
o-toluidine-p-sulfonic acid

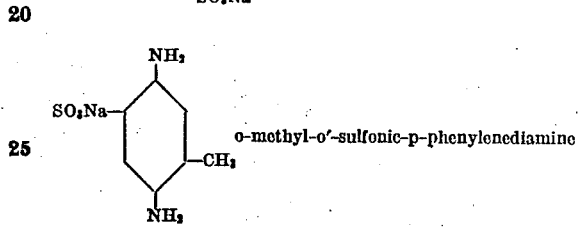
o-methyl-o'-sulfonic-p-phenylenediamine

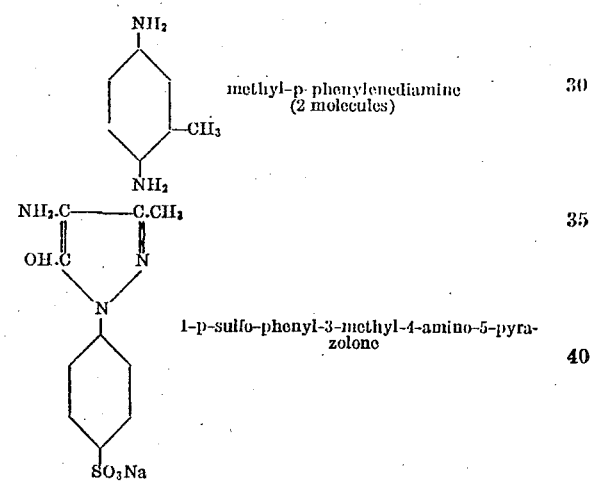
methyl-p-phenylenediamine (2 molecules)

1-p-sulfo-phenyl-3-methyl-4-amino-5-pyrazolone

I am aware that numerous details of the process may be varied through a wide range without departing from the spirit of this invention, and I do not desire limiting the patent granted other than as necessitated by the prior art.

I claim as my invention:

1. As a new article of manufacture a tetrakisazo dye as hereindescribed, having most probably the following formula:

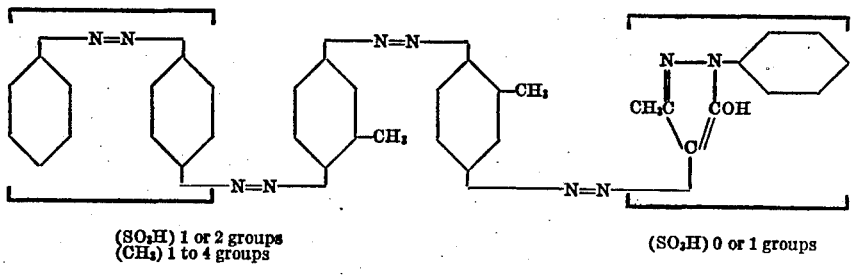

(SO₃H) 1 or 2 groups
(CH₃) 1 to 4 groups
(SO₃H) 0 or 1 groups this dye being in the shape of its sodium salt a dark powder, soluble in water to a brown solution, changing to a reddish-brown with sodium hydroxide; with hydrochloric acid separating out as a brown precipitate; said powder being insoluble in ether, partly soluble in alcohol and benzene, and being destroyed by strong reducing agents; the dyeings on cotton being orange to brown.

2. As a new article of manufacture a tetrakisazo dye having most probably the general formula:

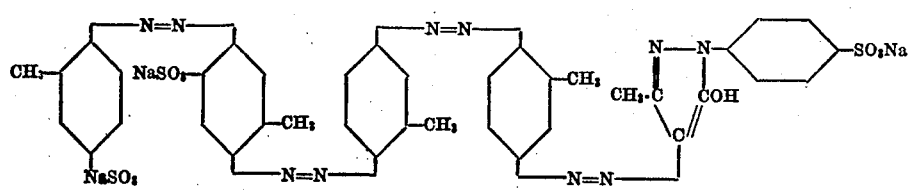

3. The method of preparing a tetrakisazo dye of the general formula:

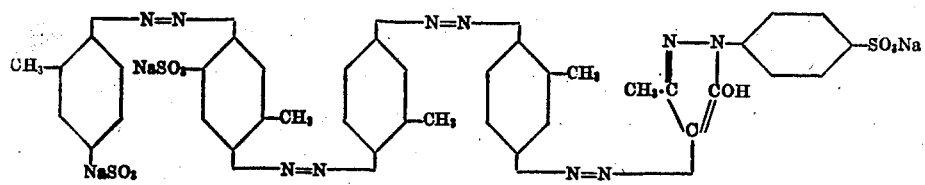

which consists in combining aminoazotoluol disulfonic acid with m-toluidine, diazotizing the intermediate dye thus obtained, combining the same with m-toluidine, diazotizing the trisazo dye and combining the last mentioned compound with phenyl methyl pyrazolone sulfonic acid.

4. Materials dyed with the dye described in claim 1.

5. Materials dyed with the dye described in claim 2.

6. The method of preparing a tetrakisazo dye of the general formula:

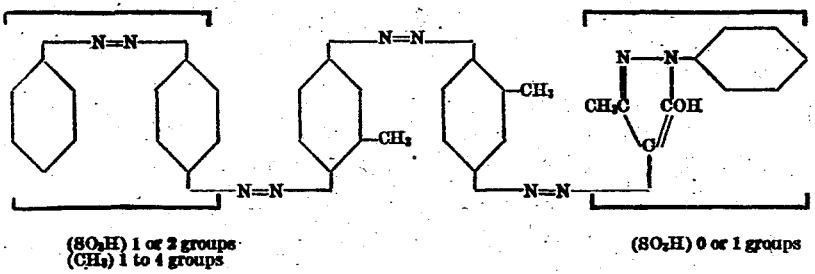

which consists in combining an amino azo body of the benzene series with m-toluidine, diazotizing the intermediate dye thus obtained, combining the same with m-toluidine, diazotizing the trisazo dye and combining the last mentioned compound with phenyl methyl pyrazolone.

In witness whereof I have hereunto subscribed my name in the presence of two subscribing witnesses.

JOSEPH B. OESCH.